INVENTOR
HARRY S. JONES
BY:
ATTORNEY.

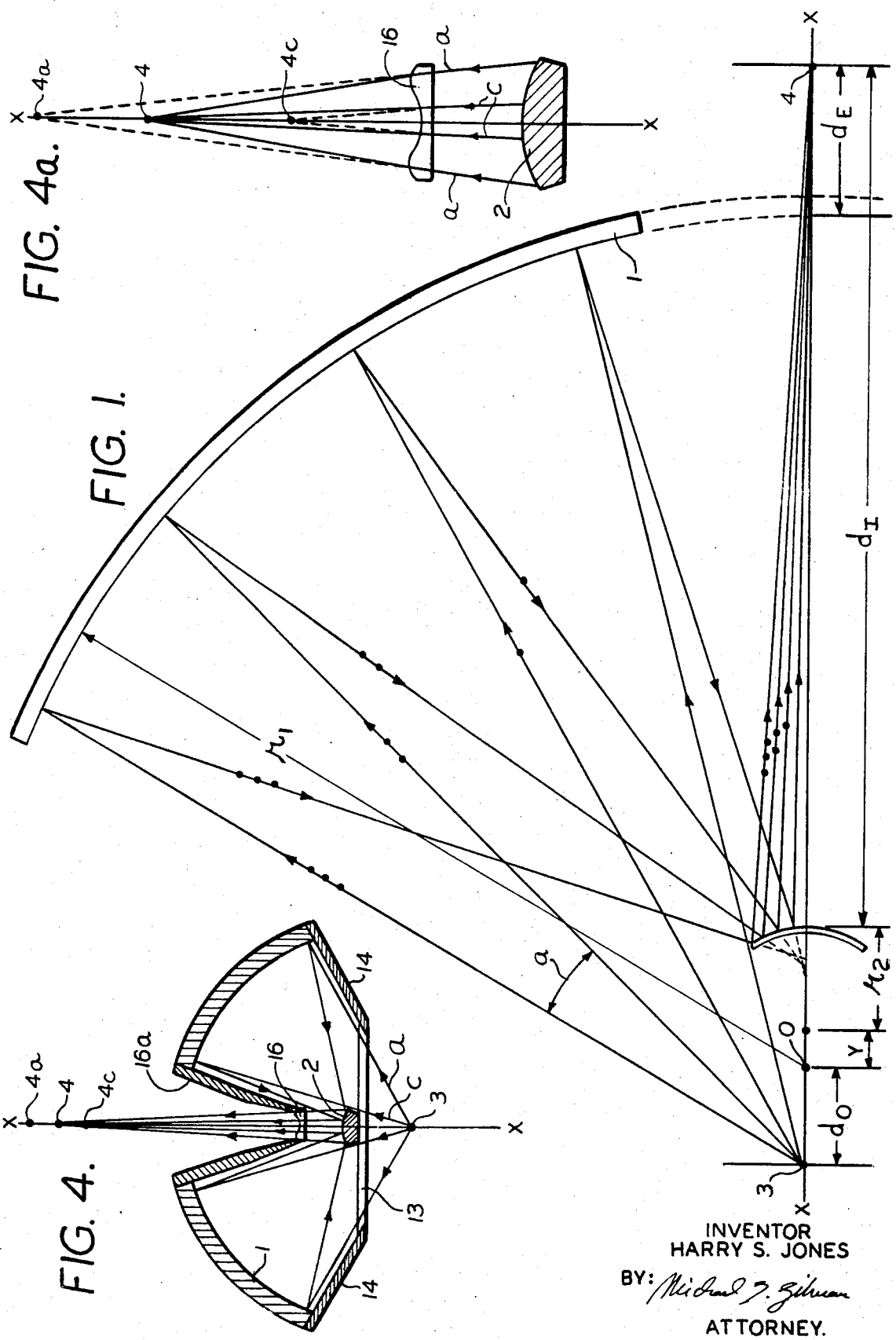

May 26, 1970  H. S. JONES  3,514,187
REFLECTIVE OPTICAL SYSTEMS
Original Filed Dec. 3, 1963  3 Sheets-Sheet 3
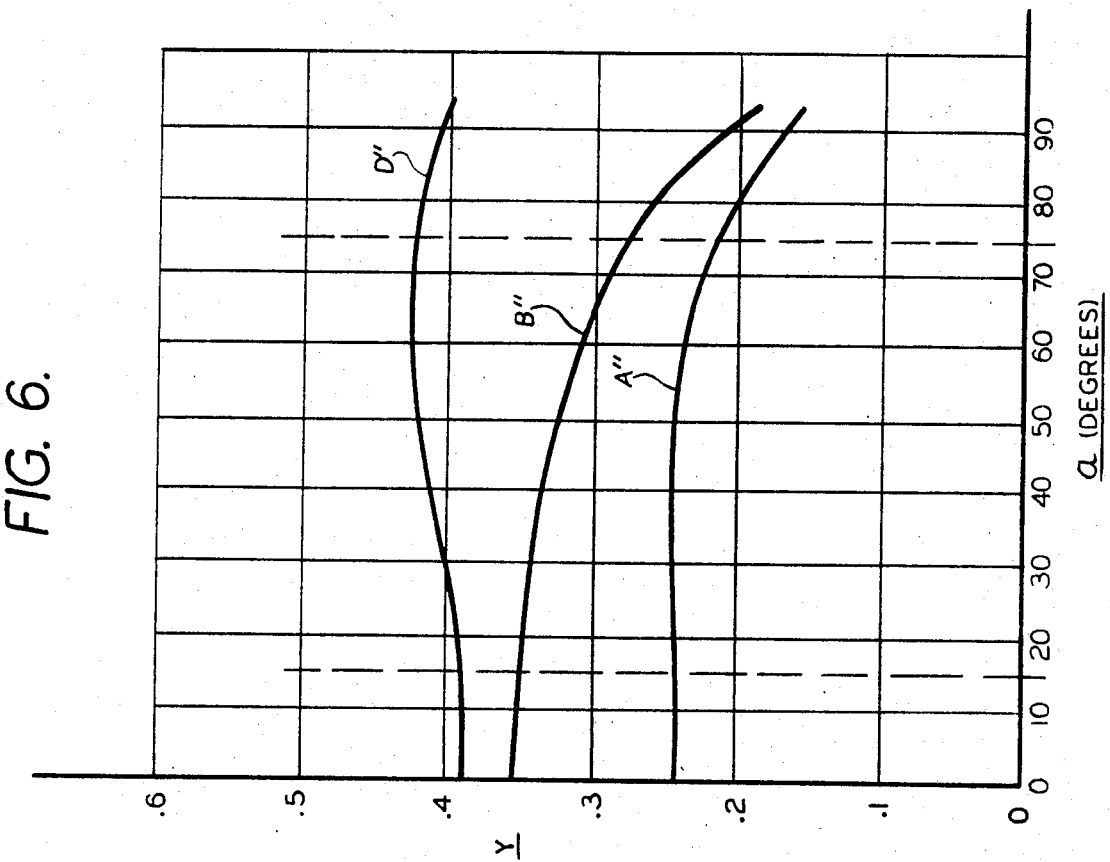
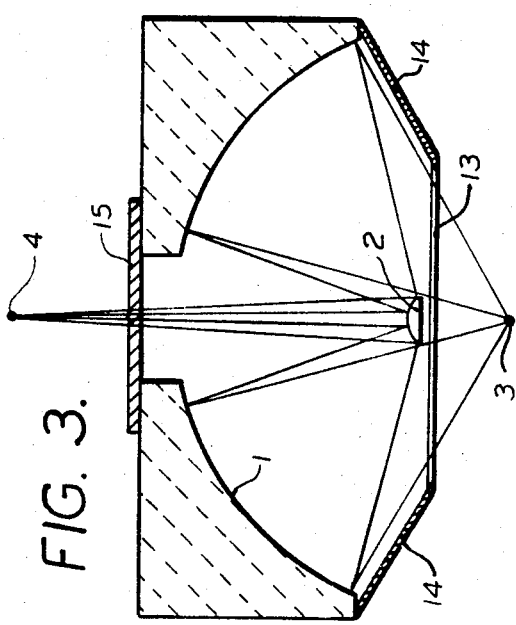
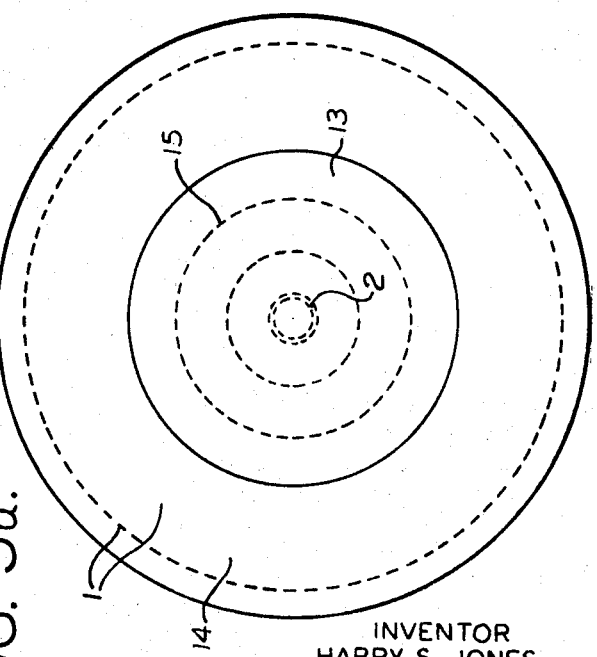
INVENTOR
HARRY S. JONES
BY *Michael S. Gitman*
ATTORNEY.

United States Patent Office 3,514,187
Patented May 26, 1970

3,514,187
REFLECTIVE OPTICAL SYSTEMS
Harry S. Jones, 50 Navesink Drive,
Monmouth Beach, N.J. 07750
Continuation-in-part of application Ser. No. 327,763,
Dec. 3, 1963, and a division of application Ser. No.
407,586, Oct. 29, 1964. This application Apr. 27,
1967, Ser. No. 634,326
Int. Cl. G02b 17/02
U.S. Cl. 350—200                                       6 Claims

ABSTRACT OF THE DISCLOSURE

This specification discloses a novel reflective optical system particularly well adapted to use as a microscope. This system employs a large concave circular mirror and a small convex circular mirror with the object located behind the convex mirror. In a similar manner the mirror system described herein can be used as a telescope if the object is placed in front of the convex mirror whereupon the image will be behind such convex mirror.

There is herein disclosed that the radii of curvature of the concave to convex mirror should be at least about 8; that the optical axes of the two mirrors should be substantially coincident; that where the object is located behind the convex mirror as in a microscope configuration, such object should be positioned at least two radii of curvature from the convex mirror surface; that, where the object is located behind the convex mirror as in a microscope configuration, the image should be spaced from the convex mirror surface at least about five radii of said convex mirror; and that the centers of the two mirrors are both located behind the convex mirror and are spaced apart from each other a substantial distance.

In a preferred embodiment disclosed there is provided an aspheric corrector lens element positioned, where the system is intended for use as a microscope, between the convex mirror and the image.

---

This application is a continuation-in-part of application Ser. No. 327,763 filed Dec. 3, 1963 and is a division of application Ser. No. 407,586 filed Oct. 29, 1964.

Dual or multiple mirror systems are well known for both microscope and telescope application. It is known that an object can be magnified through the use of appropriately shaped and positioned mirrors as for example in a microscope application. Further, such mirror systems are known for use in concentrating light from and enlarging a distant object in telescope application.

It has generally been the practice in the past to employ non-spherical mirrors for object magnification purposes since by such shaped mirrors it is possible to provide devices and systems which reflect substantially accurate images of objects. It will be appreciated that the production of highly accurate non-spherical geometric mirror shapes and surfaces is extremely time consuming and expensive. It will further be appreciated that it would be economically more desirable to be able to utilize spherical mirrors since it is obvious that the accurate production of spherical surfaces represents significant economic advantage over the production of non-spherical mirror surfaces.

Attempts have been made in the past to produce multispherical mirror systems of various sizes, shapes and relationships. It has generally been conceded by the art that such known spherical mirror systems leave much to be desired since the image produced is almost always subject to serious aberation problems.

It is therefore an object of this invention to provide a novel spherical mirror magnification system.

It is another object of this invention to provide such novel mirror system which is economical to produce.

It is a further object of this invention to provide such novel mirror system having improved optical properties.

Other and additional objects of this invention will become apparent from a consideration of this entire specification including the drawing and claims hereof.

In most, if not all, prior art spherical mirror devices, such systems have been constructed or designed so as to utilize concentric mirrors, that is mirrors having the same center of curvature. In some of the prior publications statements are made to the effect that the centers of curvature may be slightly apart. It is apparent that the intention is to provide a concentric system which may have a slight degree of non-centricity. It has now ben discovered that if a two spherical mirror system is provided where the two mirrors have significantly spaced apart centers of curvature, that is they have a substantial degree of non-centricity, it is possible to significantly reduce the aberration of the system.

Understanding of this invention will be facilitated by reference to the accompanying drawing wherein:

FIG. 1 is a diagrammatic view of a mirror system according to this invention;

FIGS. 3 and 3a are views similar to FIGS. 2 and 2a of another embodiment of this invention;

FIG. 4 is similar to FIG. 2 showing a preferred embodiment of this invention;

FIG. 4a is a schematic enlarged view of a portion of the embodiment of FIG. 4;

FIGS. 5 and 6 are a series of curves showing the improved aspect of the apparatus of this invention.

Figure 5:
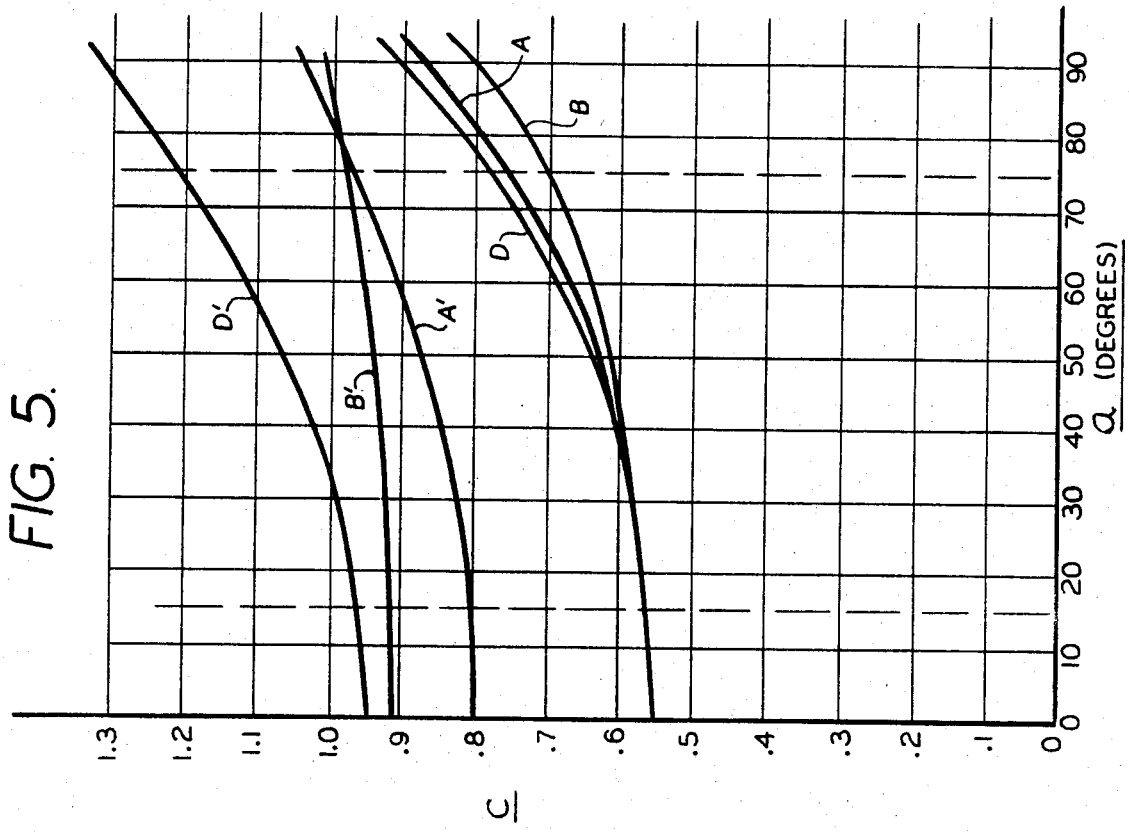

In accord with this invention, it has been found that the optical system hereof should preferably have certain physical parameters both from an optical and a practical point of view. Thus it has been found that the concave mirror should have a radius of at least about eight (8) times the radius of the convex mirror; the object should be positioned at least about two convex mirror radius lengths from the convex mirror surface and behind such mirror; the image should be at least about five (5) convex mirror radius lengths in front thereof; the concave mirror should have an optical axis aperture therein of not greater than about 30°; the center of curvature of both the convex and concave mirrors should be positioned between the convex mirror surface and the object with the concave mirror center preferably being positioned closer to the object; and the convex and concave mirror centers of curvature should be on the same optical axis and spaced apart a substantial distance. As will be explained more fully below, the exact spacing range for the two centers of curvature will vary to some extent depending upon the remainder of the physical parameters involved in the particular device. Thus for example, it is known that the spacing between the centers of curvature for a system in which the concave mirror has a radius of eight (8) times the convex mirror radius and the distance from the object to the center of curvature of the concave mirror is equal to the radius of the convex mirror is between about 0.165 and 0.245 times the convex mirror radius in order to provide compensation of aberration between the mirrors and provide a better image. Put another way, in the system described above the image will be freest from aberration where the centers of the two mirrors are spaced apart by 16 percent to 25 percent of the value of the convex mirror radius. In an otherwise identical system except where the ratio of the radii of curvature of the two mirrors is twenty (20) instead of eight (8) as stated above, this curvature center spacing is about 0.205 to 0.355 of the radius of the convex mirror. In still a further illustration of this invention, where the system described above having a radii ratio of eight (8) is operated with the object a distance from the center of the concave mirror of about 1.25 of the convex mirror radius, the curvature center spacing is again varied and in this case is from about 0.39 to 0.425 of the convex mirror radius in order to provide compensation between the mirrors.

A device made according to this invention can best be explained with reference to FIG. 1 of the drawing. There is shown a concave mirror 1 of much larger diameter than a convex mirror 2. An object 3 is shown disposed behind and spaced from the center of curvature 0 of the concave mirror by a distance $d_0$. The convex mirror 2 has a radius curvature of $r_2$ and the concave mirror 1 has a radius of curvature $r_1$. The distance between the convex and concave mirror's centers of curvature is represented as Y. An image 4 is shown spaced from the convex mirror a distance $d_I$ and spaced from the concave mirror a distance $d_E$.

Figure 2:
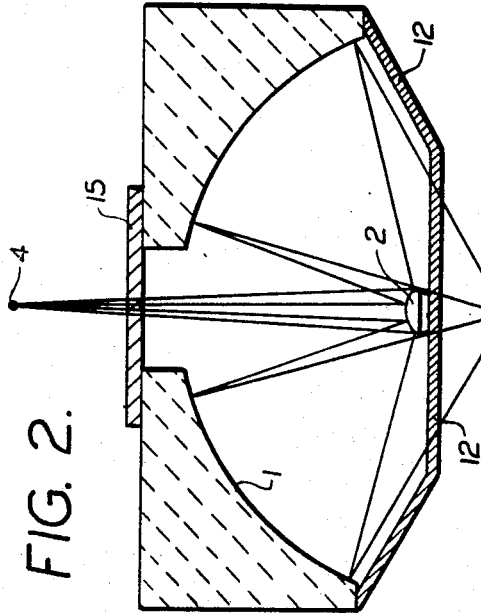
FIGS. 2 and 2a are side elevation views, partially in section, of one physical embodiment of this invention.
Figure 2A:
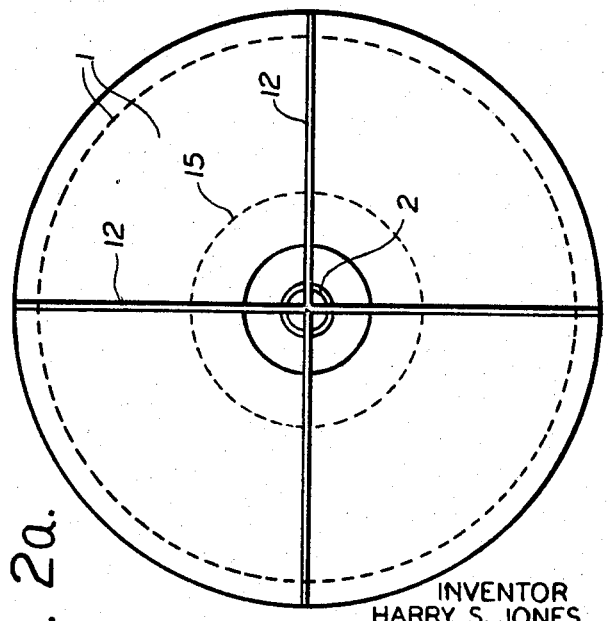

In FIGS. 2 and 2a there is shown an apparatus in accord with this invention having a concave mirror 1 and a convex mirror 2 supported on a spider 12. A transparent plate 15 is provided over the aperture in the concave mirror. The object is shown at 3 and the image at 4.

In FIGS. 3 and 3a a modified apparatus is shown having a support 14 and a transparent plate 13.

Referring to FIGS. 5 and 6 there are shown in FIG. 5 a series of curves determined for a mirror system as shown in FIG. 1. These curves were prepared by plotting the angle of incident light $a$ against the location of the virtual image on the optical axis C. The curves labeled A and A' were plotted based on a spherical mirror system with a convex mirror having a radius of 1 and a concave mirror having a radius of 8. In this system, the distance $d_0$ was equal to the convex mirror radius, that is 1 and the measurements were made for a concentric mirror system. Thus, it will be noted that the curves A and A' are spaced apart on the same scale which shows that the concentric system represented provides no compensation of aberration between the two mirrors. If one of these curves is displaced vertically along the C axis until a point thereof coincides with a point on the other curve, compensation of aberration for light at the angle $a$ corresponding to the intersecting point will occur. This vertical displacement of one of the curves is the mathematical equivalent of physically moving one of the spherical mirrors along its optical axis. The distance the curve is moved corresponds to the value Y in FIG. 1 or, put another way, is the magnitude of the degree of non-concentricity imparted to the system. Thus if the curve A, which represents the convex mirror, is vertically displaced until a point thereof is super-imposed upon and coincident with a point on the A' curve, which represents the concave mirror, at the angle $a$ of such coincidence there will be full compensation of spherical aberration. The distance the curve A is vertically moved until this first coincident point is reached is the value of Y required to obtain the minimum spherical aberration compensation for the system. As the A curve is continued to be moved vertically, it will be noted that other points of coincidence between the two curves occur at different incident light angles $a$ until finally by continued vertical movement of the curve A the last coincident point is found after which further vertical displacement (or corresponding axial movement of the convex mirror) of the curve A results in the two curves moving further apart at all points thereof. Thus it will be seen that spherical aberration compensation occurs only within a limited value of Y. FIG. 6 shows a curve A'' which plots the distance the two curves A and A' are apart assuming that they intersect at an angle $a$ of 45°.

It should be noted that as the mirror system physical parameters are changed, the range and magnitude of the value Y will change although in every case this value Y will have a definite upper and lower limit between which spherical aberration compensation is accomplished and outside of which no compensation is possible for that particular system. It will be appreciated in every case, however, such values of Y will be substantial proportions of the convex mirror radius. Thus the curves B and B' of FIG. 5 should be considered. These curves represent a mirror system which is identical to the mirror system represented by the curves A and A' except that the concave mirror radius is twenty (20) times the convex mirror radius. In considering these B and B' curves it should be noted that vertical displacement of the B curve toward the B' curve will result in a certain minimum value of Y and a certain maximum value of Y between which spherical aberration compensation occurs and outside of which no possibility of compensation exists.

The D and D' of FIG. 5 were prepared from a mirror system which was identical to the system employed for preparing the A and A' curves except that the value of $d_0$ was set at 1.25 times the convex mirror radius. Consideration of these curves indicates that the minimum values of Y (the vertical displacement necessary to provide compensation) are generally higher than for the curves A and A'. It will be appreciated that for any mirror system of given parameters, it would be most desirable to have a constant Y value for all angles of incident light. It will be further appreciated that the curves A'' and D'', for systems having the same parameters for the value of $d_0$, have markedly different slopes for comparable angles of incident light. Thus it would appear that a value of $d_0$ of between 1 and 1.25 would probably result in a system having a much flatter compensation curve.

Thus, a system is described herein having two spherical mirrors which are significantly non-concentric, which can be arranged so as to provide good spherical aberration compensation merely by adjusting the degree of non-concentricity of the two mirrors. Further improvements in the spherical aberration compensation of such a dual mirror system is shown to be possible and practical by adjustment of the distance between the object and one of the mirror's center of curvature.

While so adjusting a mirror system according to this invention to provide maximum spherical aberration compensation will produce excellent results, a further improvement of this system provides for the additional utilization of an aspheric transparent corrector plate through which the light rays pass on their way from the convex mirror to the image.

Aspheric corrector plates are known in the optics art. However, these known plates are often of extremely complicated surface construction in order to be able to correct significant aberrational effects. The aspheric correctors of this invention, however, are of much simpler construction than those used in the prior art because the non-concentricity of the mirror elements hereof initially compensates for significant amounts of spherical aberration and only the minor remnants thereof need be corrected by the corrector plate.

A further aspect of this invention lies in the positioning of the corrector plate after the convex mirror in the light ray path. Thus, according to this aspect, no attempt is made to correct the light rays impinging on the convex mirror so as to vary them in a manner such that the resultant reflection therefrom will be correct and accurate. Rather, the convex and concave mirrors are varied in their optical axis linear relationship so as to provide as much aberration compensation as possible and the resulting, slightly aberrated light rays are subjected to a final, relatively minor correction through the corrector plate. Thus, a much simpler and economically more desirable system is achieved.

An example of a bi-mirror system employing a corrector plate is shown in FIGS. 4 and 4a. In FIG. 4, there is shown a mirror system comprising a concave mirror 1, a convex mirror 2, an object 3, an image 4, a corrector plate 16, a support 16a for the corrector plate, and a support 13 for the convex mirror.

In FIG. 4a, there is shown the effect of the aspheric corrector plate 16 by indicating in dashed lines where the image would be 4a and 4c if the corrector plate was not utilized to consolidate the image at 4.

It will be appreciated that the mirror elements described herein may be made of any of the known materials such as silvered glass, polished metal, silvered plastic, etc. It will also be appreciated that the corrector plate, being a lens element rather than a mirror element should be transparent and may be glass or a suitable plastic. According to a most preferred embodiment of this invention, the corrector plate is made of a plastic which is transparent and is magnetically or electrostatically attractable at least in its liquid state, for example, an acrylic polymer and particularly polymethyl methacrylate having an extremely thin film of conductive metal on the surface of such liquid.

It will further be appreciated that, as a practical matter, particularly in microscope systems, the angle of incident light which is useful only amounts to between about 15° and 75° on each side of the optical axis. Thus, with reference to FIG. 5, it will be seen that thereby the portions of the compensation curves having the greatest slope, i.e., above 75°, are eliminated from consideration.

What is claimed is:

1. A spherical mirror system comprising a large concave mirror having an aperture therein along the optical axis thereof of up to about 30°; a convex mirror within the sphere of said concave mirror having the same optical axis as said concave mirror; wherein a corrector plate is positioned between said convex mirror and an image of said mirror system, said convex mirror is adapted to be spaced from an object at least about twice the convex mirror radius and is adapted to be spaced from said image at least about five times the convex mirror radius; wherein said concave mirror and said convex mirror are so positioned as to have their centers of curvature adapted to be located between said convex mirror and said object; wherein the ratio of the radius of the concave mirror to the radius of the convex mirror is at least about 8 and wherein said centers of curvature are spaced apart at a distance equal to a substantial proportion of the convex mirror radius.

2. A mirror system as claimed in claim 1 wherein said centers of curvature are spaced apart by at least about 16 percent of the convex mirror radius.

3. A mirror system as claimed in claim 1 wherein said corrector plate positioned between said convex mirror and said image is aspheric.

4. A mirror system as claimed in claim 3 wherein said corrector plate is disposed along said optical axis between said mirror surfaces.

5. A mirror system as claimed in claim 4 wherein said corrector plate has a diameter up to the diameter of said aperture.

6. A mirror system as claimed in claim 3 wherein said concave mirror has a conical member mounted on the aperture periphery thereof directed toward said convex mirror and said corrector plate is mounted in said conical member.

References Cited

UNITED STATES PATENTS

| | | | |
|---|---|---|---|
| 2,485,345 | 10/1949 | Ackerman | 350—199 |
| 2,534,543 | 12/1950 | Bullock | 350—200 |
| 2,684,015 | 7/1954 | Grey | 350—199 |
| 3,066,569 | 12/1962 | MacDonald | 350—294 |

DAVID SCHONBERG, Primary Examiner

M. J. TOKAR, Assistant Examiner